US006886622B2

(12) United States Patent
Villhard (10) Patent No.: US 6,886,622 B2
(45) Date of Patent: May 3, 2005

(54) METHOD OF FABRICATING A SHAPE MEMORY ALLOY DAMPED STRUCTURE

(75) Inventor: Robert L. Villhard, Fountain Valley, CA (US)

(73) Assignee: The Boeing Company, Seattle, WA (US)

(*) Notice: Subject to any disclaimer, the term of this patent is extended or adjusted under 35 U.S.C. 154(b) by 145 days.

(21) Appl. No.: 10/407,657

(22) Filed: Apr. 4, 2003

(65) Prior Publication Data

US 2003/0194320 A1 Oct. 16, 2003

Related U.S. Application Data

(62) Division of application No. 10/080,208, filed on Feb. 19, 2002, now Pat. No. 6,699,015.

(51) Int. Cl.$^7$ ............................................... B22D 19/00
(52) U.S. Cl. .................................... 164/98; 164/100
(58) Field of Search ................................... 164/98, 100

(56) References Cited

U.S. PATENT DOCUMENTS

| | | |
|---|---|---|
| 2,405,283 A | 8/1946 | Birmann |
| 2,648,520 A | 8/1953 | Schmitt |
| 2,664,240 A | 12/1953 | Gorton |
| 2,999,669 A | 9/1961 | McGinnis |
| 3,468,513 A | 9/1969 | Schmitz |
| 3,619,076 A | 11/1971 | Kydd |
| 3,848,307 A | 11/1974 | Kydd |
| 3,867,068 A | 2/1975 | Corsmeier et al. |
| 3,958,905 A | 5/1976 | Wood |
| 3,966,357 A | 6/1976 | Corsmeier |
| 3,967,353 A | 7/1976 | Pagnotta et al. |
| 4,095,999 A | 6/1978 | Brook et al. |
| 4,179,240 A | 12/1979 | Kothmann |
| 4,183,456 A | 1/1980 | Schilling et al. |
| 4,183,719 A | 1/1980 | Bozung |
| 4,190,398 A | 2/1980 | Corsmeier et al. |
| 4,268,223 A | 5/1981 | Anner et al. |

(Continued)

FOREIGN PATENT DOCUMENTS

| | | |
|---|---|---|
| EP | 0 812 928 B1 | 11/1999 |
| GB | 2 084 262 A | 4/1982 |
| WO | WO 99/67548 A2 | 12/1999 |

OTHER PUBLICATIONS

News; Furukawa Super–elastic NT–Tube; www.fitec.co.jp/ftm/nt–e/nttube.
Introduction to Shape Memory Alloys; www.sma–mems.com/intro.
Active Materials Laboratory; Shape Memory Alloys; http://aml.seas.ucla.edu/SMA/index.html.
Darel E. Hodgson, et al.; http://www.sma–inc.com/SMAPaper.html; (1999).
Torben Lenau, Shape Memory Alloys (SMA); http://www.designinsite.dk/htmsider/ml1310; (1997–98).
Use of Shape Memory Alloys for Structural Damping; Aug. 7, 1995; http://www.cecer.army.mil/fl/seg/sma.
Ch. 4, Metals, alloys and ceramics; Scientific Report 1996 Katholieke Universiteit Leuven; (1996).

*Primary Examiner*—Kiley S. Stoner
*Assistant Examiner*—I.-H. Lin
(74) *Attorney, Agent, or Firm*—Alston & Bird LLP (57) ABSTRACT

A damped blade is provided that includes a blade structural member defining at least one coolant channel and a liner formed of a shape memory alloy extending at least partially along the at least one coolant channel defined by the blade structural member. The shape memory alloy that forms the liner is maintained generally at its transition temperature by means of coolant circulated through the coolant channel. The shape memory alloy that forms the liner will resist the onset of vibrations within the blade, thereby effectively damping blade vibrations. A method of fabricating a damped blade is also provided.

6 Claims, 4 Drawing Sheets

U.S. PATENT DOCUMENTS

| | | | |
|---|---|---|---|
| 4,329,119 A | 5/1982 | Baskin | |
| 4,330,235 A | 5/1982 | Araki | |
| 4,380,574 A | 4/1983 | Gessinger et al. | |
| 4,383,854 A | 5/1983 | Dembowski et al. | |
| 4,484,859 A | 11/1984 | Pask et al. | |
| 4,615,659 A | 10/1986 | Sidransky | |
| 4,629,397 A | 12/1986 | Schweitzer | |
| 4,684,326 A | 8/1987 | Wassell et al. | |
| 4,722,668 A | 2/1988 | Novacek | |
| 4,776,763 A | 10/1988 | Light | |
| 4,859,141 A | 8/1989 | Maisch et al. | |
| 4,872,812 A | 10/1989 | Hendley et al. | |
| 5,005,678 A | 4/1991 | Julien et al. | |
| 5,052,890 A | 10/1991 | Roberts | |
| 5,165,860 A | 11/1992 | Stoner et al. | |
| 5,226,784 A | 7/1993 | Mueller et al. | |
| 5,232,344 A | 8/1993 | El-Aini | |
| 5,302,085 A | 4/1994 | Dietz et al. | |
| 5,398,916 A | 3/1995 | Krämer et al. | |
| 5,407,321 A | 4/1995 | Rimkunas et al. | |
| 5,498,137 A | 3/1996 | El-Aini et al. | |
| 5,508,116 A | 4/1996 | Barrett | |
| 5,611,874 A | 3/1997 | Zadno-Azizi et al. | |
| 5,641,364 A | 6/1997 | Golberg et al. | |
| 5,645,402 A | 7/1997 | Cornelius et al. | |
| 5,750,272 A | 5/1998 | Jardine | |
| 5,820,343 A | 10/1998 | Kraft et al. | |
| 5,843,244 A | 12/1998 | Pelton et al. | |
| 5,973,440 A | 10/1999 | Nitzsche et al. | |
| 6,195,979 B1 | 3/2001 | Fukuyama | |
| 6,283,707 B1 | 9/2001 | Chin | |
| 6,422,010 B1 * | 7/2002 | Julien | 60/527 |
| 6,439,847 B2 | 8/2002 | Taeck | |
| 6,699,015 B2 * | 3/2004 | Villhard | 416/96 A |

* cited by examiner

ately, these damp- 60 structural member, the blade structural member is preferably

METHOD OF FABRICATING A SHAPE MEMORY ALLOY DAMPED STRUCTURE

CROSS REFERENCE TO RELATED APPLICATION

This application is a DIV of 10/080,208 filed on Feb. 19, 2002 now issued as U.S. Pat. No. 6,699,015.

BACKGROUND OF THE INVENTION

The present invention relates to the cooling and damping of rotor blades and stationary vanes (both of which are generically referred to herein as "blades" unless otherwise indicated). The invention relates more particularly to cooling and damping of blades using a coolant supplied to internal channels in the blades that are lined with a shape memory alloy, or superelastic alloy (both of which are hereinafter generally referred to as a "shape memory alloy").

Compressors and turbines are examples of the turbo-machinery that include a number of rotor blades that are driven in a rotational sense by a gas passing therethrough. For example, a turbine produces rotational power by receiving high-temperature, high-pressure gases such as combustion gases from a fuel combustor, and expanding the gases to a lower temperature and lower pressure via an alternating series of stationary vanes and rotating blades. A gas turbine may have a single "stage" consisting of a row of stationary vanes followed by a row of rotor blades, or it may have two or more such stages in series.

In high-performance gas turbine engines, the temperature of the combustion gases entering the first stage of the turbine typically is so high that the available materials for constructing the stationary vanes and rotor blades are not capable of withstanding the extreme temperature without some type of active cooling of the blades and vanes. Thus, modern advances in gas turbine technology have largely been made through discoveries of improved materials capable of withstanding higher temperatures, coupled with improved cooling schemes. These cooling schemes have included film cooling techniques and the circulation of coolant through internal passages defined by a turbine blade as described in more detail by U.S. patent application Ser. No. 10/029,451 entitled Fluid-Cooled Turbine Blades by James Lobitz, et al. filed Dec. 19, 2001; the contents of which are incorporated herein in their entirety.

The blades of compressors, turbines and other turbo-machinery oftentimes also disadvantageously vibrate during operation. These vibrations are primarily due to disturbances in the working fluid and the relatively high rotational speeds at which these machines operate. Among other things, blade vibration may shorten the life and reduce the operating range, including the maximum rotational speed, of a compressor, turbine or other turbo-machinery. In order to improve the efficiency with which compressors, turbines and other turbo-machinery operate and to permit the rotational speeds of these turbo-machines to be further increased, it is desirable to reduce the vibration of the blades. As such, several techniques have been developed to at least partially damp blade vibration.

One device intended to reduce blade vibration applies friction at the tips of the blades. Unfortunately, these damping devices include a large number of components which increase the cost and complexity of the damping devices. In addition, these damping devices or components thereof may possibly become separated from the blades, thus creating the risk of foreign object damage to the blades and/or other portions of the compressor, turbine or other turbo-machinery incorporating these damping devices.

Another damping technique employs annular vibration, or shock, absorbers formed of shape memory alloys that are disposed proximate the base or root of the blade. Since the vibrations are generally more pronounced proximate the tips of the blades, however, the annular vibration, or shock, absorbers placed near the base or root of the blades may not damp the vibrations as efficiently as desired.

Accordingly, although various techniques have been developed to damp blade vibrations, it would be desirable to improve the damping of blade vibrations in order to increase the life and operating range, including rotational speeds, of turbines, compressors and other turbo-machinery.

SUMMARY OF THE INVENTION

The present invention addresses the above needs and achieves other advantages, by providing a damped blade (either a rotor blade or a stationary vane of a compressor, turbine or other turbo-machinery) that comprises a blade structural member defining at least one coolant channel and a liner formed of a shape memory alloy extending at least partially along the at least one coolant channel defined by the blade structural member. The shape memory alloy that forms the liner is preferably maintained generally at its transition temperature by means of coolant circulated through the at least one coolant channel. As such, the shape memory alloy that forms the liner will resist the onset of vibrations within the blade, thereby effectively damping blade vibrations.

The blade structural member generally extends along a blade longitudinal axis from an inner end to an outer end. In one advantageous embodiment, the blade structural member defines the coolant channel to be formed of first and second legs. The first and second legs are in fluid communication such that coolant passes from the first leg into the second leg during operation. In this embodiment, the first leg extends longitundally from the inner end of the blade structural member to a location proximate the outer end of the blade structural member. The second leg, in turn, is connected to the first leg at the location proximate the outer end of the blade structural member and returns to the inner end of the blade structural member. In this embodiment, the liner may also include first and second portions that extend at least partially along the first and second legs, respectively. Preferably, the first portion of the liner is formed of a shape memory alloy having a transition temperature that is lower than the transition temperature of the shape memory alloy that forms the second portion of the liner. As such, the coolant can maintain the shape memory alloy that forms the liner at approximately its transition temperature even as the coolant is heated during its passage through the coolant channel.

In addition, the first leg may be proximate to the pressure side of the blade and the second leg may be proximate to the other surface of the blade (e.g. the suction side of the blade). Thus, the liner of the first leg is positioned to absorb the compressive force generated by the blade vibrating toward the first leg, while the liner of the second leg is positioned to absorb the corresponding tensile force.

Other than the coolant channel(s) defined by the blade structural member, the blade structural member is preferably solid. Additionally, the damped blade of the present invention is preferably designed to enhance the load transfer path between the blade structural member and the liner formed of a shape memory alloy in order to insure effective transfer of the compressive and tensile forces created in the blade structural member by the onset of blade vibration and to correspondingly enhance the vibrational damping.

Typically, the liner is in contact with the material forming the blade structural member along the entire length of the coolant channel. In order to enhance the load transfer path, the liner of one embodiment may have a roughened exterior surface. In addition or in the alternative, the liner may define a circumferential groove on the exterior surface of the liner. While the circumferential groove may extend in various manners about the exterior surface as the liner, the liner of one embodiment defines the circumferential groove to extend helically in a longitudinal direction. In the alternative, a raised land may extend circumferentially around the exterior of the liner to enhance the load transfer.

The damped blade may be incorporated in a blade damping system according to one aspect of the present invention. In this regard, the blade damping system not only includes the blade, including the blade structural member defining at least one coolant channel and a liner formed of a shape memory alloy extending at least partially along the at least one coolant channel, but also a heat exchanger. The heat exchanger is in fluid communication with the at least one coolant channel. As such, the heat exchanger extracts heat from coolant following passage of the coolant through the at least one coolant channel. The heat exchanger then redirects or returns the coolant to the at least one coolant channel.

Advantageously, the heat exchanger serves to maintain the coolant at a temperature having a predetermined relationship with respect to a predefined transition temperature of the shape memory alloy that forms the liner. Shape memory alloys exhibit several transition temperatures with the temperature of the coolant having a predetermined relationship with respect to any one or more of the transition temperatures. The transition temperatures include the Af temperature, the Ap temperature, the As temperature, the Mf temperature, the Mp temperature and the Ms temperature.

In this regard, the heat exchanger is generally adapted to maintain the coolant in a range from just below the Af temperature of the shape memory alloy to 50 degrees C. above the Af temperature, thereby facilitating the vibration damping by the shape memory alloy that forms the liner. In the alternative, the coolant temperature may be maintained between the Mp and Ap temperatures or between the Mf and Af temperatures of the shape memory alloy. Other ranges, defined with respect to the various transition temperatures are encompassed by the invention.

The blade of the present invention may be fabricated in various manners. According to another aspect of the present invention, however, a method of fabricating the blade is provided in which a prefabricated liner, typically having a first leg and a second leg, and formed of a shape memory alloy is positioned within a mold that defines the shape of the resulting blade. The mold is then filled with an at least partially molten blade material that has a lower melting temperature than the shape memory alloy.

For example, the liner may be made of the shape memory alloy Nitinol and the mold may be filled with molten aluminum. In this example the aluminum has a lower melting temperature than Nitinol. Advantageously, the melting point of aluminum alloys, generally 650 degrees C., happens to be well within the heat treating temperature range for Nitinol, generally 500 to 800 degrees C. Thus, the molding of the aluminum blade may be tailored to simultaneously perform the heat treatment of the Nitinol liner. By combining the blade molding operation with the liner heat treatment, an energy savings may be realized.

Regardless of the blade material, the blade material at least partially surrounds the liner formed of a shape memory alloy. The blade material is then permitted to at least partially solidify prior to removing the mold to thereby produce the blade having the liner formed of a shape memory alloy at least partially embedded therein.

In one embodiment, the liner is filled with a liquid that boils at a lower temperature than the melting temperature of the blade material prior to filling the mold with the at least partially molten blade material. For example, the liner may be filled with water prior to introducing the at least partially molten blade material. Upon the introduction of the at least partially molten blade material, the liquid boils off to somewhat cool the liner formed of a shape memory alloy and to create a slight compressive fit of the cooled, solidified blade material about the liner. In the alternative, the liner may be left empty and allowed to heat during the molding of the blade in order to heat treat the shape memory alloy of the liner, as discussed previously. Upon completion of the heat treatment, the liquid may then be rapidly introduced into the liner to quench the shape memory alloy liner. Another embodiment includes continuously flowing liquid through the liner to provide quenching and/or continuous cooling through the blade molding operation.

Accordingly, a blade is provided according to the present invention that effectively damps vibrations. In addition, the blade of at least some embodiments is cooled concurrent with the vibration damping. As a result of the vibration damping and cooling, the blade of the present invention may increase the life and operating range of a compressor, turbine or other turbo-machinery.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
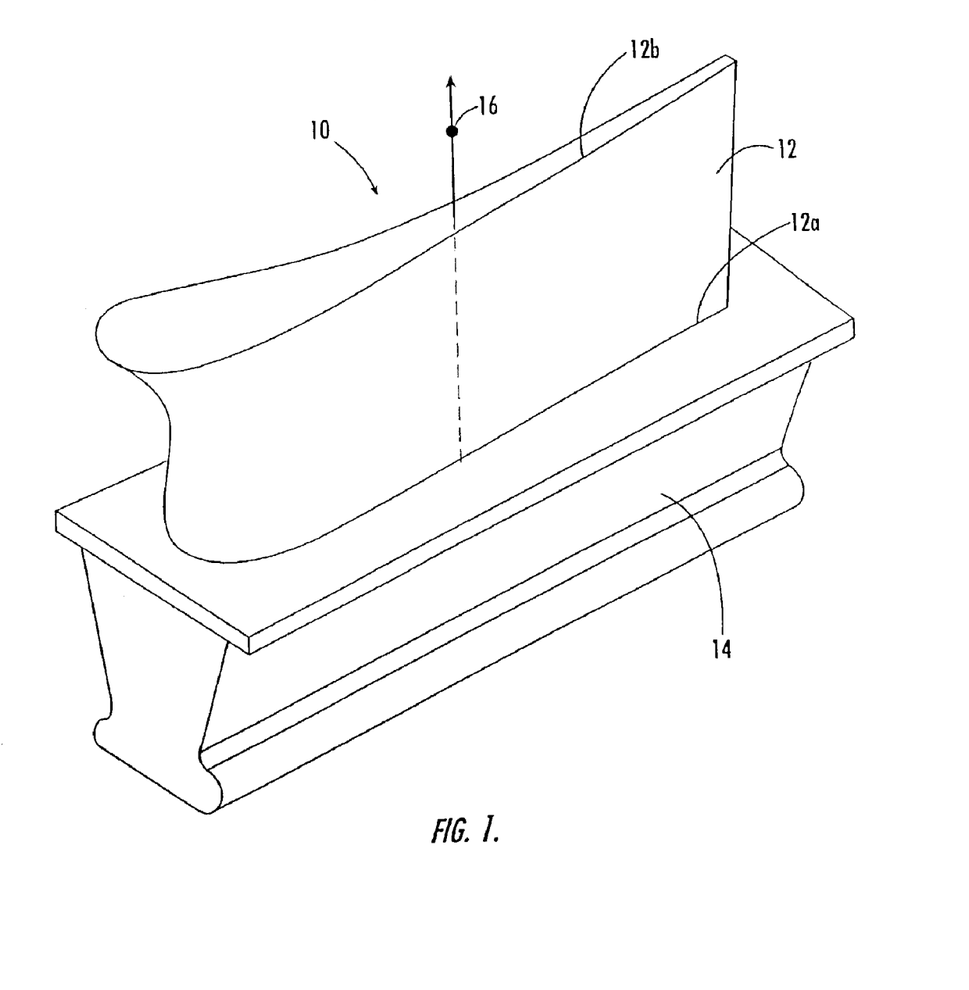
FIG. 1 is a schematic perspective view of a turbine rotor blade in accordance with one embodiment of the present invention.
Figure 2:
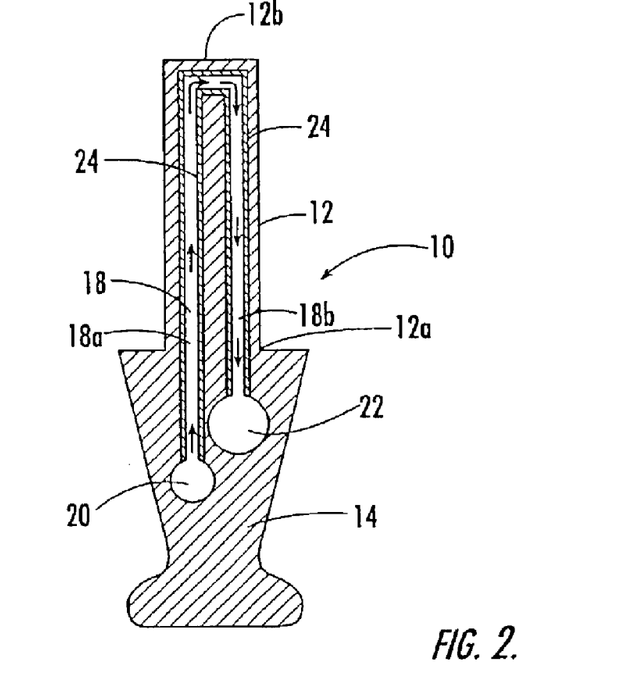
FIG. 2 is a schematic cross-sectional view of a blade in accordance with one embodiment of the present invention.
Figure 3:
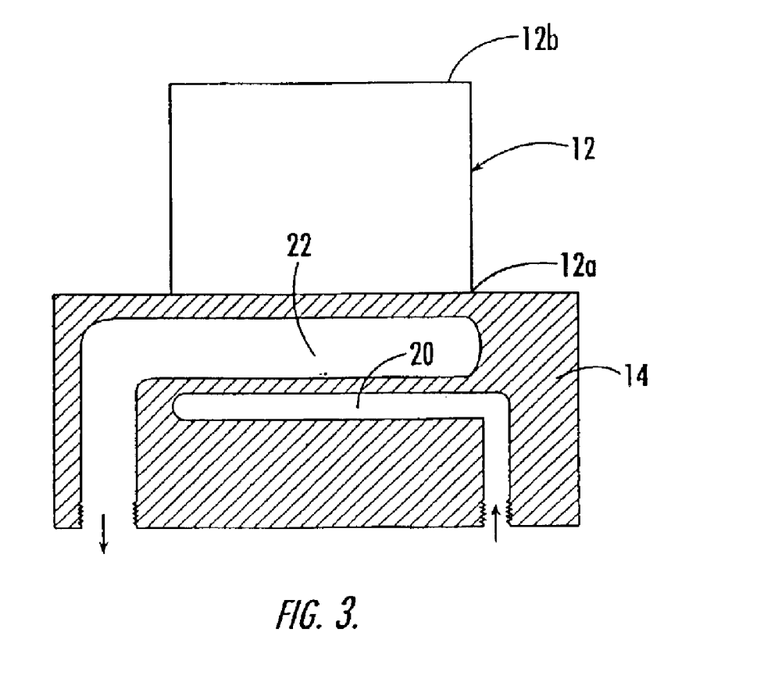
FIG. 3 is a schematic side view of a blade in accordance with one embodiment of the present invention, with the blade root sectioned to show the coolant manifolds.

With reference to FIGS. 1–3, blade 10 in accordance with one preferred embodiment of the invention is shown in schematic representation. For purposes of example, a turbine rotor blade will be hereinafter described. However, the blade of the present invention may be utilized by other turbomachinery, such as compressors, that would benefit from the reduction in blade vibration and/or an increase in blade cooling. Moreover, the turbines, compressors or other turbomachinery that include blades according to the present invention may be utilized in various industries, including the turbines and compressors utilized in power generation facilities, chemical manufacturing facilities, and in aircraft and rocket engines to name a few.

The blade 10 generally includes a blade airfoil portion and a blade root portion 14. The blade airfoil portion comprises a structural member 12 that substantially defines the airfoil shape of the blade, and whose primary function is to withstand the various loads exerted on the blade during use and to maintain structural integrity of the blade. As shown in FIG. 1, the blade structural member extends along a blade longitudinal axis 16 from an inner end 12a to an opposed outer end, or tip, 12b, with the generally airfoil-shape being defined in cross-section normal to the blade longitudinal axis. The structural member is accordingly formed of any of various conventional materials used for forming turbine rotor blades, including but not limited to aluminum, nickel-based superalloys and others. The inner end of the structural member is attached to the blade root that serves to affix the rotor blade in a turbine disk. The blade root and the structural member can comprise a monolithic structure formed from a single piece of material, or can comprise two separately formed members that are subsequently joined.

The blade structural member 12 defines at least one and, more typically, a plurality of coolant channels 18. Although the coolant channels may extend through the blade structural member in various directions and orientations, the blade structural member of one advantageous embodiment defines the coolant channels to extend from the inner end 12a toward the outer end 12b thereof, and back to the inner end thereof. Thus, the coolant channels are generally considered to have first and second legs 18a, 18b that are in fluid communication with one another to thereby define a continuous coolant channel. In this regard, the first leg of a coolant channel extends from the inner end of the blade structural member to a location proximate the outer end of the blade structural member. Similarly, the second leg of the coolant channel extends from the location proximate the outer end of the blade structural member to the inner end thereof. Thus, coolant may be circulated from the inner end of a blade structural member through the first leg of a coolant channel to a location proximate the outer end of the blade before returning to the inner end of the blade structural member via the second leg.

While the first and second legs 18a, 18b of the coolant channels 18 may also be defined in various manners by the blade structural member 12, the blade structural member of one embodiment defines the first leg of each coolant channel to extend along the concave or pressure-side surface of the blade structural member and the second leg of each coolant channel to extend along the convex or suction-side surface of the blade structural member. In addition, the coolant channels are preferably located proximate the exterior surface of the blade structural member to facilitate heat transfer from the exterior surface of the blade structural member that is exposed to the hot gasses to the coolant passing through the coolant channels. Moreover, the coolant channels are preferably disposed within those portions of the blade structural member that are otherwise anticipated to be subjected to the largest amounts of vibrational stress during operation such that the vibrational damping will be most pronounced.

FIG. 2 shows a cross-sectional view of a blade 10 in accordance with the invention along a plane generally parallel to the blade longitudinal axis 16, which typically extends generally radially with respect to a turbine disk in which the blade is installed. FIG. 3 is a cross-section in a plane parallel to the blade longitudinal axis and perpendicular to the plane of FIG. 2. As shown, each coolant passage 18 is fed coolant from a coolant supply manifold 20 formed in the blade root 14. Although not illustrated, the coolant supply manifold would be connected with a further coolant supply duct in the turbine, which duct may be formed in the turbine disk, for example. Suitable sealing mechanisms (not shown) would seal the interfaces between the coolant supply manifolds in the blades and the corresponding supply ducts in the disk or other structure of the turbine.

Coolant, which for instance may comprise liquid water, flows from the coolant supply manifold 20 radially outwardly along the first leg 18a of each of the coolant channels 18 and then flows radially inwardly along the second leg 18b of each of the coolant channels 18. As the coolant traverses the coolant channels, it will be heated. The heated coolant flows back into the blade root 14 and into a coolant exhaust manifold 22 formed therein. The coolant exhaust manifold would be connected to a coolant exhaust duct provided, for example, in the turbine disk, and sealed to the duct with suitable sealing mechanisms. Since the exhausted coolant typically may contain a substantial fraction of gas whereas the supplied coolant is liquid, the exhaust manifold generally has a larger cross-sectional flow area relative to the supply manifold 20, as shown.

According to the present invention, the damped blade 10 also includes a liner 24 extending at least partially along the at least one coolant channel 18 defined by the blade structural member 12. Typically, the liner extends along the entire length of the coolant channel such that the coolant is in direct contact with the material that forms the liner, as opposed to the material that forms the blade structural member. According to the present invention, the liner is formed of a shape memory alloy having a predefined transition temperature. As known to those skilled in the art, shape memory alloys have a number of transition temperatures including the Af temperature at which a shape memory alloy finishes transforming to Austenite upon heating, the Ap temperature at which a shape memory alloy is about 50% transformed to Austenite upon heating as measured by the peak on a Differential Scanning Calorimeter (DSC) curve, the As temperature at which a shape memory alloy starts transforming to Austenite upon heating, the Mf temperature at which a shape memory alloy finishes transforming to Martensite upon cooling, the Mp temperature at which a shape memory alloy is about 50% transformed to Martensite upon cooling as measured by the peak on a DSC curve, and the Ms temperature at which a shape memory alloy starts transforming to Martensite upon cooling. Further details regarding the various transition temperatures of a shape memory alloy are provided at www.sma-inc.com The coolant that is passed through the at least one coolant channel 18 advantageously maintains the shape memory alloy generally at a transition temperature. By maintaining the shape memory alloy generally at a transition temperature, it is meant that the coolant will maintain the shape memory alloy at or within a predefined range of a particular transition temperature, for example, from just below the Af temperature of the shape memory alloy to 50 degrees C. above the Af temperature of the shape memory alloy. The liner 24 formed of a shape memory alloy effectively damps at least some of the blade vibrations. In this regard, vibration of the blade structural member will create compressive and tensile forces that are imparted upon the liner. By maintaining the shape memory alloy that forms the liner generally within such a temperature range, the liner, in response to the compressive and tensile forces will, in turn, transition between the austenite and martensite phase, thereby damping the vibration.

Shape memory alloys show superelastic behavior if deformed at a temperature which is slightly above their transition temperatures, such as above the Af temperature, for example. This effect is caused by the stress-induced formation of some martensite above its transition temperature. Because it has been formed above its normal temperature, the martensite reverts immediately to undeformed austenite as soon as the stress is removed. This process provides a very springy, "rubberlike" elasticity in these alloys.

Also of interest is the hysteresis of the shape memory alloy. Where the hysteresis is defined as the temperature difference between a phase transformation upon heating and cooling. In NiTi alloys, it is generally measured as the difference between Ap and Mp.

Although not wishing to be bound by theory, the vibration damping provided by the liner 24 formed a shape memory alloy may be due to the hysteresis of the shape memory alloy. In this regard, hysteresis is defined as the temperature difference between a phase transformation upon heating and cooling. In NiTi alloys, it is generally measured as the difference between Ap and Mp. As a result, higher levels of stress is required to impart a strain to the stronger austenite that absorbs an amount of work. The lower stress at which the strain is relieved in the transformed, weaker, martensite phase, releases a second and smaller amount of work. Thus when a transition occurs, the SMA changes shape and size which results in a reduction in energy in the vibrating blade. Accordingly the absorbed, net work will be released as heat during the transformations.

The liner 24 may be formed of various shape memory alloys with a coolant, selected and conditioned to maintain the shape memory alloy within the desired temperature range of a transition temperature of the shape memory alloy, circulating through the coolant channel 18. In one embodiment, for example, the liner is formed of an alloy of nickel and titanium, such as Nitinol. Depending upon its composition, Nitinol has a transition temperature between −100° C. and +200° C.

Nitinol is commercially availble in varying compositions. For example, Shape Memory Applications, Inc. of San Jose, Calif. offers a number of compositions designated, for example: an S alloy composed of about 55.8% Ni with the balance formed of Ti and having Ap from −5 to 15 degrees C. and Af from 10 to 20 degrees C., an N alloy composed of about 56% Ni with the balance formed of Ti and having Ap from −20 to −5 degrees C. and Af from 0 to 20 degrees C., a C alloy composed of about 55.8% Ni, 0.25% Cr with the balance formed of Ti and having Ap from −20 to −5 degrees C. and Af from 0 to 10 degrees C., a B alloy composed of about 55.6% Ni with the balance formed of Ti and having Ap from 15 to 45 degrees C. and Af from 20 to 40 degrees C., a M alloy composed of between about 55.1% and 55.5% Ni with the balance formed of Ti and having Ap from 45 to 95 degrees C. and Af from 45 to 95 degrees C., and an H alloy composed of less than 55% Ni with the balance formed of Ti and having Ap greater than 95 degrees C. and Af from 95 to 115 degrees C. In the foregoing examples, all of the compositions are in terms of the approximate percent by weight. Further details are provided at www.sma-inc.com.

Other shape memory alloys may also be employed including those listed in K. Shimizu and T. Tadaki, Shape Memory Alloys, H. Funakubo, Ed., Gordon and Breach Science Publishers (1987), as follows:

| Alloy | Composition | Transformation Temperature Range degrees C |
|---|---|---|
| Ag—Cd | 44/49 at. % Cd | −190 to −50 |
| Au—Cd | 46.5/50 at. % Cd | 30 to 100 |
| Cu—Al—Ni | 14/14.5 wt. % Al 3/4.5 wt. % Ni | −140 to 100 |
| Cu—Sn | approx. 15 at. % Sn | −120 to 30 |
| Cu—Zn | 38.5/41.5 wt. % Zn | −180 to −10 |
| Cu—Zn—X (X = Si, Sn, Al) | a few wt. % of X | −180 to 200 |
| In—Ti | 18/23 at. % Ti | 60 to 100 |
| Ni—Al | 36/38 at. % Al | −180 to 100 |
| Ni—Ti | 49/51 at. % Ni | −50 to 110 |
| Fe—Pt | approx. 25 at. % Pt | approx. −130 |
| Mn—Cu | 5/35 at. % Cu | −250 to 180 |
| Fe—Mn—Si | 32 wt. % Mn, 6 wt. % Si | −200 to 150 |

Shape memory alloys having higher transition temperatures are also known. For instance, U.S. Pat. No. 6,010,584 discloses Niobium-Ruthenium and Tantalum-Ruthenium shape memory alloys having transition temperatures up to 1420 degrees C. These high temperature shape memory alloys may be employed to fabricate the liner 24 for high temperature applications such as aircraft and rocket engine turbine blades.

Thus, a liner 24 formed of a shape memory alloy, such as Nitinol, may be tailored to have a transition temperature that is approximately equal to the working temperature of the coolant. As a result of the transition temperatures of some compositions of Nitinol including the range of 0° C. to 100° C., the coolant of this embodiment may be water. Treated water is preferred to reduce scaling and other deposits. Though the inherent corrosion resistance of Nitinol would also allow for the use of untreated water as a coolant. Another embodiment would use pressurized water or steam for the coolant for liners having transition temperatures exceeding 100 degrees C. It may be desirable, however, to offset the tensile effects of pressurizing the shape memory alloy liner by providing a compressive fit of the blade 10 about the shape memory alloy liner as discussed previously.

The coolant will typically absorb heat from the blade structural member 12 so as to advantageously cool the blade 10 during its passage through the coolant channel 18. As such, the coolant flowing through the second leg 18b of a coolant channel will typically be somewhat hotter than the coolant flowing through the first leg 18a of the same coolant channel. In order to ensure that the coolant can maintain the shape memory alloy that forms the liner 24 generally at its transition temperature (for instance the Af temperature), the liner may have two or more portions arranged sequentially along the coolant channel from a first portion proximate the coolant supply manifold 20 to a last portion proximate the coolant exhaust manifold 22. At least some portions of the liner of this embodiment may be formed of different shape memory alloys or different compositions of the same shape memory alloy such that the transition temperatures of the shape memory alloys that form the respective portions of the liner increase sequentially along the coolant channel. As such, the shape memory alloy that forms the first portion of the liner may have a lower transition temperature than the shape memory alloy that forms the last portion of the liner.

In this embodiment, the liner 24 is advantageously designed such that the shape memory alloy that forms the first portion of the liner has a transition temperature that is approximately equal to the temperature of the coolant that is supplied via the coolant supply manifold 20. The other portions of the liner are then formed of shape memory alloys having predefined transition temperatures that are approximately equal to the anticipated temperature of the coolant during its passage through the respective portion of the coolant channel. In this regard, the anticipated temperature of the coolant is typically based upon the estimated quantity of heat that the coolant will have absorbed from the blade structural member. As such, the coolant can continue to maintain the shape memory alloy that forms the liner of this embodiment at its transition temperature even as the temperature of the coolant increases during its passage through the coolant channel. While the relatively broad range of one exemplary temperature range (from just below the Af temperature to 50 degrees C. above the Af temperature) allows for a liner made of one or two shape memory allow compositions, the invention encompasses a liner having a composition continuously tailored along the flow path. The tailored composition thus ensures that at each point along the liner, the coolant would be within the temperature range defined by the Af temperature of the liner at each point.

Other embodiments include tailoring the hysteresis of the shape memory alloy forming the liner 24 to narrow or braoden the range over which vibration damping may be achieved via the liner. For isntance copper may be added to a Nitinol alloy to narrow the hysteresis to approximately 10 to 15 degrees C. In the alternative, Niobium may be added to the Nitinol alloy to broaden the hysteresis to over 100 degrees C. By broadening the temperature range in which vibration damping may occur, this embodiment relaxes the requirements for temperature control of the coolant.

The blade 10 is preferably fabricated to enhance the load transfer path from the blade structural member 12 to the liner 24. As such, the compressive and tensile forces created by blade vibrations will be readily imparted to the liner. Typically, the liner is in contact with the material forming the blade structural member along the entire length of the coolant channel., The exterior surface of the liner, i.e., the surface of the liner facing and directly contacting the blade structural member, may include a surface feature to further enhance the load transfer path. For example, the exterior surface of the liner may be roughened, either as a result of the original manufacturing process or subsequent thereto. In addition or alternatively, the liner may define a circumferential groove opening through its exterior surface. In this regard, the circumferential groove of one embodiment extends helically in a lengthwise direction along the coolant channel. Still further, a raised land may extend circumferentially around the exterior of the liner to enhance the load transfer. Imparting a slight compressive fit during blade molding, discussed previously, also enhances the load transfer path by reducing the possibility that the blade material would fail to bond to the liner surface during blade molding.

In order to further enhance the vibration damping, the first leg of the liner 24 may be proximate to the pressure side of the blade 10 and the second leg may be proximate to the other surface of the blade (e.g. the suction side of the blade). Thus, the liner of the first leg is positioned to absorb the compressive force generated as the blade moves toward the first leg during a half of one cycle of the vibration, while the liner of the second leg is positioned to absorb the corresponding tensile force. During the other half of a cycle of vibration, the first leg absorbs a tensile force and the second leg absorbs the corresponding compressive force.

Figure 4:
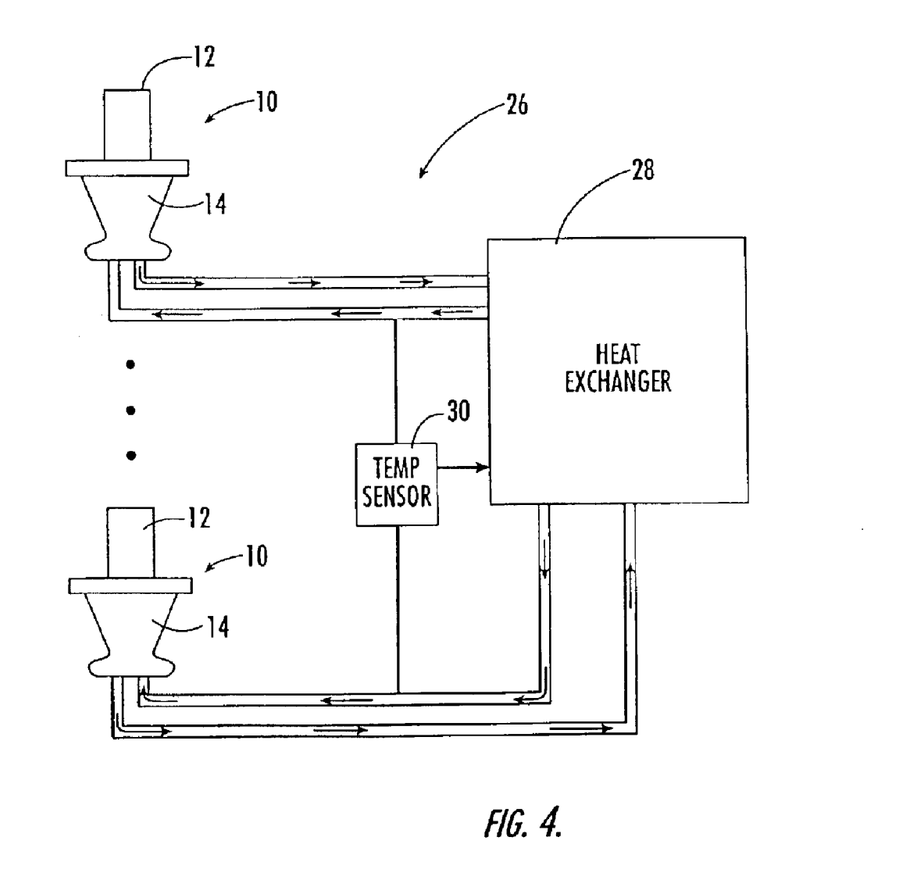
FIG. 4 is a schematic representation of a blade damping system according to another aspect of the present invention.

As shown in FIG. 4, the blade 10 may be one portion of a blade damping system 26. In this aspect of the present invention, the blade damping system also includes a heat exchanger 28 for receiving the coolant following its circulation through the coolant channel(s) 18 defined by the blade structural member 12. The heat exchanger is designed to extract heat from the coolant and to then redirect the coolant, at a lower temperature than that at which the coolant was received, to the coolant channel defined by the blade structural member. According to this aspect of the present invention, the heat exchanger preferably cools the coolant to a temperature having a predetermined relationship with respect to the predefined transition temperature of the shape memory alloy that forms the liner 24. More preferably, the heat exchanger is advantageously adapted to cool the coolant generally to the predefined transition temperature of the shape memory alloy. Thus, the coolant circulating through the coolant channel(s) can be maintained generally at the transition temperature of the shape memory alloy forming the liner. To provide feedback to the heat exchanger such that the heat exchanger may properly cool the circulating coolant, the blade damping system may also include a temperature sensor 30 adapted to measure or otherwise sense the temperature of the coolant returned to the coolant channel(s).

The blade 10 of the present invention may be fabricated in various manners. However, a blade is fabricated in accordance with one aspect of the present invention by being cast in place. In this embodiment, a mold is initially provided that defines the shape of the resulting blade. See block 40 of FIG. 5. One or more liners formed of a shape memory alloy are then positioned within the mold. See block 42. Typically, the tube(s) will serve as liners 24 for respective coolant channels 18 defined by the resulting blade. The mold is then filled with an at least partially molten blade material. See block 46. As described below, the opposed ends of the tube(s) preferably remain open and accessible as the at least partially molten blade material is poured thereabout. The blade material has a lower melting temperature than the shape memory alloy that forms the tube(s) such that the tube(s) remain solid even as the at least partially molten blade material at least partially surrounds the tube(s). While various materials may be utilized, the shape memory alloy may be formed of Nitinol having a melting temperature of between about 1240° C. and 1310° C. and the blade material may be formed of aluminum having a melting temperature of about 660° C. The blade material is then permitted to at least partially and, more typically, completely solidify prior to removing the mold. See block 48.

Advantageously, the molding of the aluminum blade 10 may be tailored to simultaneously perform the heat treatment of the Nitinol liner 24, thereby providing an energy savings as a result of the combination of the blade molding operation with the liner heat treatment. As known to those skilled in the art, the heat treatment parameters chosen to set both the shape and the properties of a shape memory alloy part are typically determined experimentally for each desired part's requirements. In general, temperatures as low as 400 degrees C. and times as short as 1–2 minutes can set the shape, but generally a temperature closer to 500 degrees C. and times over 5 minutes are utilized. In other instances, heat treating to impart the desired memory shape is done at 500 to 800 degrees C., or as low as 300 to 350 degrees C. if sufficient time is allowed. The shape memory alloy component may need to be restrained in the desired memory shape during the heat treatment, such as by applying compressive forces to the ends of the liner or by intentionally designing the liner somewhat smaller than its desired so that it grows to the proper size during the heat treatment process. In the alternative, the liner may be preheated to the pouring temperature of the blade material. In this manner the heat of the solidifying blade material will not cause a thermal expansion or distortion of the liner.

Following heat treatment, rapid cooling of some form is generally preferred via a water quench or rapid air cool (if both the parts and the fixture are small) for shape memory alloy parts. Higher heat treatment times and temperatures will increase the actuation temperature of the shape memory alloy part and often gives a sharper thermal response. This sharper thermal response is not without a tradeoff, however, since there is usually a concurrent drop either in peak force or in plateau stresses. There is also an accompanying decrease in the ability of the shape memory alloy element to resist permanent deformation.

By way of example, since the aluminum blade material of one embodiment of the present invention solidifies at 660 degrees C. (within the 500 to 800 degrees C. range previously mentioned), the fabrication method of this embodiment of the present invention advantageously heat treats the shape memory alloy, i.e., Nitinol, that forms the liner 24 during blade molding. Also, since higher heat treatment times and temperatures will increase the actuation temperature of the Nitinol liner, the time required to solidify the blade 10 results in a damped blade capable of service at higher temperatures. Of course the time required for the blade to solidify may be increased or decreased by heating or cooling the blade mold during blade molding to tailor the actuation temperature of the liner.

Advantageoulsy, the function of the liner 24 is to serve as a cooling channel also permits the liner to support coolant flow therethrough following the heat treatment for quenching purposes. In this regard, when the heat treatment is finished, a liquid coolant may be rapidly introduced into the liner, thereby quenching the shape memory alloy liner and hastening the solidification or cooling of the blade material. The coolant may be water, air, or other coolants known to the art.

Once the mold has been removed as shown in block 50, the blade having the tube(s) formed of a shape memory alloy at least partially embedded therein is produced. In those embodiments in which the tube(s) define the liner of a respective coolant channel, the fittings on the opposed ends of the tube are preferably exposed to facilitate connection with the coolant supply manifold 20 and the coolant exhaust manifold 22, respectively.

Figure 5:
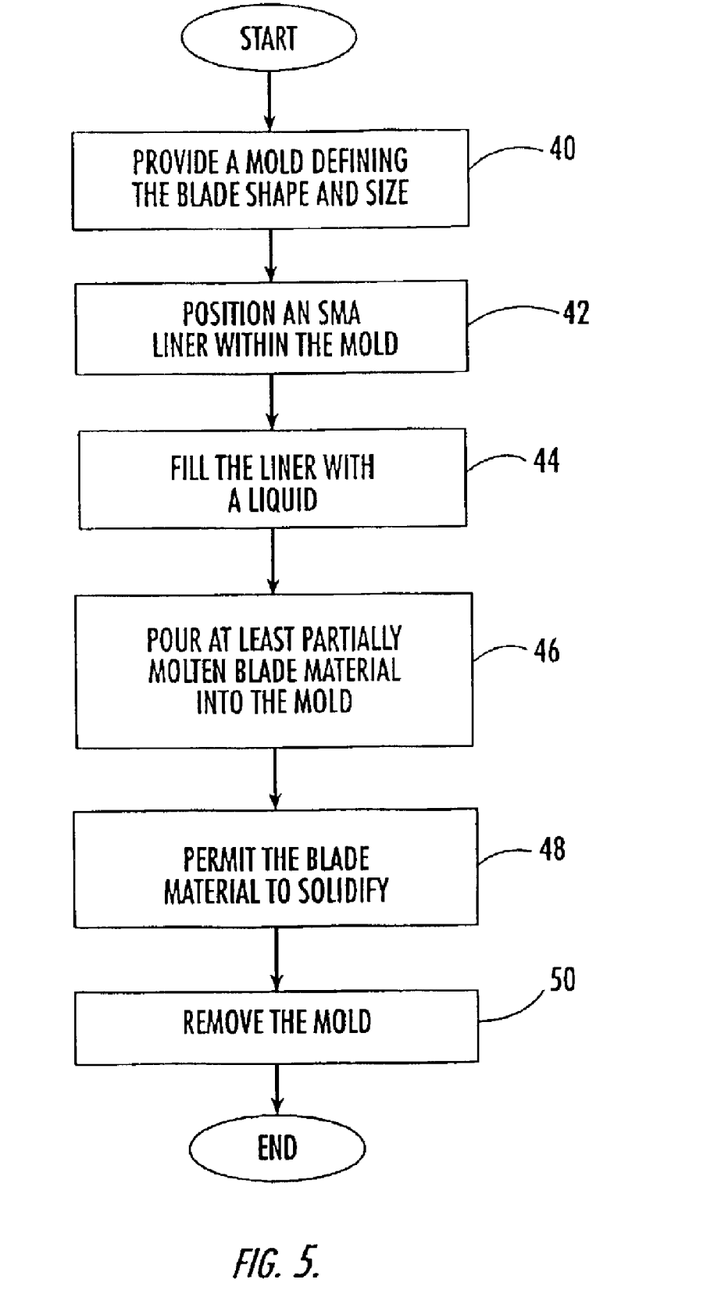
FIG. 5 is a flow chart illustrating the operations performed to fabricate a blade according to yet another aspect of the present invention.

In one embodiment, the liner 24 is preferably filled with a liquid prior to pouring the at least partially molten blade material into the mold. See block 44. Since the liquid preferably boils at a lower temperature than the melting temperature of the blade material, the liquid will evaporate or boil off as the at least partially molten blade material is poured into the mold. In one embodiment, the liner is filled with water prior to introduction of the at least partially molten blade material. By permitting the liquid, such as water, to boil off with the introduction of the at least partially molten blade material, the liner formed of a shape memory alloy is somewhat cooled and a slight compressive fit of the cooled, solidified blade material around the liner may be created. As such, the load transfer path from the blade structural member 12 to the liner formed of a shape memory alloy is thereby enhanced within the resulting blade 10.

As mentioned above, a compressor, turbine or other turbo-machinery incorporating the damped blade 10 of the present invention may be utilized in various applications. For example, the damped blade may be utilized within the power generation industry by turbo-machinery within an electricity generating steam plant. In this application, the blade may be designed such that the predefined transition temperature of the shape memory alloy that forms the liner 24 is generally equal to the operating temperature of the cooling water available in the electricity generating steam plant. As such, the cooling water may be utilized as the coolant circulated through the coolant channels 18 defined by the blade. Since this cooling water is available in large quantities on a continuous basis, the blade could be cooled and vibrations could be damped without requiring a heat exchanger 28 or other type of closed loop temperature control as described above in conjunction with the embodiment of FIG. 4. Alternatively, the damped blade may be utilized within the aerospace industry by the compressors and turbines within aircraft engines. In this application, the blade may be designed such that the shape memory alloy forming the liner has a transition temperature that is generally equal to the temperature of air at the cruising altitude of an aircraft. As such, the air may be utilized as the coolant that circulates through the coolant channels. Again, the compressor, turbine or other turbo-machinery of this embodiment could be utilized in an open-loop fashion without requiring a heat exchanger or other closed-loop temperature control due to the continuous availability of air as a coolant.

Accordingly, a blade 10 is provided according to the present invention that effectively damps vibrations. In addition, the blade of at least some embodiments cools the blade concurrent with the vibration damping. As such, the blades of the present invention may increase the life and operating range, including the maximum operating temperature, of a compressor, turbine or other turbo-machinery.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating a blade comprising:

positioning a liner formed of a shape memory alloy (SMA) within a mold;

filling the mold with an at least partially molten blade material having a lower melting temperature than the shape memory alloy such that the blade material at least partially surrounds the liner;

permitting the blade material to at least partially solidify; and removing the mold to thereby produce the blade having the liner at least partially embedded therein.

2. A method according to claim 1 further comprising filling the liner with a liquid that boils at a lower temperature than the melting temperature of the blade material prior to filling the mold with the at least partially molten blade material.

3. A method according to claim 2 wherein filling the liner with a liquid comprises filling the mold with water.

4. A method according to claim 1 wherein filling the mold with an at least partially molten blade material comprises filling the mold with molten aluminum.

5. A method according to claim 1 wherein positioning the liner comprising positioning a liner formed of a shape memory alloy with a transition temperature up to 1420 degrees C.

6. A method according to claim 1 wherein positioning the liner comprises positioning a liner formed of a shape memory alloy including ruthenium within the mold.

* * * * *